United States Patent [19]

Strobel et al.

[11] Patent Number: 4,971,813

[45] Date of Patent: Nov. 20, 1990

[54] PROCESS FOR MAKING CONCENTRATED LOW CALORIE FRUIT JUICE

[75] Inventors: Rudolf G. K. Strobel; Robert E. Tarr, both of Cincinnati, Ohio

[73] Assignee: The Procter & Gamble Company, Cincinnati, Ohio

[21] Appl. No.: 479,140

[22] Filed: Feb. 13, 1990

[51] Int. Cl.$^5$ ............................................. A23L 2/02
[52] U.S. Cl. ........................................ 426/51; 426/62; 426/387; 426/599
[58] Field of Search ............... 426/50, 51, 387, 599, 426/52, 62

[56] References Cited

U.S. PATENT DOCUMENTS

| | | |
|---|---|---|
| 2,641,550 | 6/1953 | Dykstra et al. ............... 99/205 |
| 3,118,776 | 1/1964 | Byer et al. ................... 99/205 |
| 3,140,187 | 7/1964 | Brent ......................... 99/205 |
| 3,248,233 | 4/1966 | Brent et al. .................. 426/387 |
| 4,374,865 | 2/1983 | Strobel ....................... 426/599 |
| 4,463,025 | 7/1984 | Strobel ....................... 426/599 |
| 4,561,941 | 12/1985 | Dinnage et al. ............... 426/387 |

FOREIGN PATENT DOCUMENTS

| | | | |
|---|---|---|---|
| 0700061 | 12/1964 | Canada ................. | 426/387 |
| 0632137 | 9/1982 | Switzerland . | |

OTHER PUBLICATIONS

Food Engineering, "Cloud Stable Vegetable Puree with New Enzymes", 7/87, pp. 39–40.
Rohm tech., Inc. Product Bulletin #134,6/87.
J. Agric Food Chem., vol. 26, No. 2, 1978, Ahmed et al., "Effect of Selected Oil and Essence Volatile Components on Flavor Quality of Lumpout Orange Juice".

*Primary Examiner*—Marianne Cintins
*Attorney, Agent, or Firm*—R. A. Dabek; J. J. Yetter; R. C. Witte

[57] ABSTRACT

This invention relates to an efficient process for separating and recovering aroma and flavor volatiles from fruit or vegetable juices and for lowering the amount of sugar in juices. The process involves removing the aroma/flavor volatiles from juice by forming a microaerosol by spraying juice at a temperture of from 45° C. to 110° C. through a nozzle having a diameter of about 100 microns to 1200 microns at a velocity of 100 m/sec. to 250 m/sec. and into a vacuum chamber at 5 mm to 200 mm Hg and at temperatures of from 10° C. to about 55° C. and then treating the recovered juice fraction with a yeast. The alcohol formed during this fermentation reaction is removed by distillation, preferably by the same aerosolization process as the volatiles are removed. The aroma and flavor volatiles are returned to the juice to provide a good tasting low calorie fruit juice.

20 Claims, No Drawings

PROCESS FOR MAKING CONCENTRATED LOW CALORIE FRUIT JUICE

TECHNICAL FIELD

This invention relates to an efficient process for separating and recovering aroma and flavor volatiles from fruit or vegetable juices and for lowering the sugar levels of these juices thus making a lower calorie, less sweet processed beverage. The beverage is characterized by its improved flavor display due to retention of more than about 75% of the aroma and flavor volatiles originally present in the beverage and by its lower sugar content.

BACKGROUND OF THE INVENTION

Consumption of noncarbonated fruit and vegetable juices has greatly increased since 1950 due to technological breakthroughs in the juice processing and concentration industry. Better quality, better tasting and higher purity juice products which are more convenient to use have been developed.

The challenge of producing beverages which are acceptable to a broad range of consumers involves making a unique product having an acceptable flavor, distinctive aroma, acceptable appearance and satisfactory mouthfeel. The aroma and flavor ingredients and the level of sugars affect each of these characteristics.

Consumers are becoming more calorie conscious and also concerned about the total amount of sugars consumed daily. A good tasting beverage which is low in calories and low in sugars is desirable. There is also a need to retain the vitamins and other nutrients, including fibers (pectin) present in the fruit juice.

During the process of concentrating beverages, especially those involving evaporation, a significant portion of the aroma and flavor volatiles are removed with the water vapors. These volatiles consist of various alcohols, esters, aldehydes, ketones, acids, etc. This loss results in a significant deterioration in quality and overall flavor of the concentrated beverage.

Evaporation processes involve heating the beverage under conditions which promote hydrolysis and/or oxidation of components of the beverage. This causes chemical alterations of the aroma and flavor compounds as well as other materials. For instance, lipids can be oxidized and the amino acids and sugars can undergo browning reactions. Such degradation products can cause off flavors in the concentrated beverage. Thus, conventional evaporation processes frequently result in off-flavors and flavor loss in the juice product produced. Pectin and pulp in the beverage adsorb aroma and flavor components which also contributes to lower display of aroma and flavor levels.

It is generally recognized that while evaporation concentration processes are useful and fairly effective, there is still a significant loss of aroma and flavor compounds which occurs.

Numerous methods have been devised to compensate for the loss of aroma and flavor during evaporation concentration processes. For instance, U.S. Pat. No. 4,463,025, Strobel, issued July 31, 1984, discloses a process for preparing a fruit juice concentrate prepared from natural citrus fruit ingredients. This process involves freeze concentration. The citrus fruit juice concentrate has at least 35% solids including pulp, nonvolatile compounds, pectin and volatile compounds. This citrus fruit juice concentrate has at least 65% of the aroma and flavor volatile compounds of the natural juice. (See also U.S. Pat. No. 4,374,865 to Strobel (1983), which claims a concentrated orange juice).

U.S. Pat. No. 3,248,233 Brent et al., issued Apr. 26, 1966, discloses a method of minimizing the overall loss of aroma and flavor compounds by collecting "essence" of the juice. Essence is the term applied to the first 15% to 20% of the water which is removed through evaporation and which contains a significant amount of volatile aroma and flavor compounds. The escaping essence is condensed, the aroma and flavor compounds recovered and rectified as water is removed, and then added back to concentrated juice. U.S. Pat. No. 3,140,187 Brent, et al, issued July 7, 1964, discloses a juice concentration method.

U.S. Pat. No. 3,118,776, Byer et al., issued Jan. 21, 1964, discloses a multi-step process for recovering the volatile flavor fraction from fruit juices at temperatures of less than 120° F. (49° C.). In a closed system, a thin continuous film of citrus juice is distributed over a heat exchange surface at a substantially reduced pressure to partially concentrate the juice by separating it into two components. The minor fraction containing the aroma and flavor volatiles is condensed and removed. After another separation, the remaining mixture is distilled at a temperature below 100° F. (38° C.) and a pressure of less than 1.5 inches mercury (57.5 mm Hg).

U.S. Pat. No. 2,641,550, Dykstra et al, issued June 9, 1953, discloses the removal of volatiles from orange juice via heating, evaporating under vacuum or by stripping with an inert gas, e.g., nitrogen. Three condensers are used to condense the vapors. The first-stage condenser is maintained at 32° F. (0° C.) to 85° F. (29° C.); 90% to 98% of the distillate is removed. This first fraction is discarded. The second stage condenser is maintained at 32° F. (0° C.) to −95° F. (−139° C.), while the third stage condenser is maintained below −130° F. (−202° C.). The distillates recovered from the second and third stage condensers are later added to the orange juice concentrate.

Each of these procedures is not totally satisfactory because only a fraction of the escaping aroma and flavor volatile compounds can be collected and recovered. Thus, there is necessarily a significant loss in the overall aroma and flavor of the final concentrated product.

Others have tried different procedures for adding back certain volatile compounds and essences to concentrated beverages to enhance the overall flavor and consumer acceptability of the juice. For example, Ahmed et al, *J. Agri. Food Chemistry*, 26,2, 368–372 (1978), describe the addition of certain volatile compounds and essences to juice concentrate after their recovery from the evaporator. The objective was to match the aroma and flavor found in fresh orange juice.

The process herein is able to remove the volatiles in less than a second versus an hour for vacuum distillation and minutes for other evaporation techniques using film or plate evaporators.

Others have tried fermentation as a means of making low calorie juices. Swiss patent No. 632,137 (1978) discloses an alcohol free low calorie fruit juice made by fermentation or enzymatic conversion of sugar in juice. The sugar free juice is combined with a natural juice at a ratio of 1 to 1. Alternatively, the sugar free juice can be sweetened using an artificial sweetener to provide a very low calorie juice. Apple juice can be used in this process. In this procedure, the aroma and flavor is removed with the alcohol, not before the fermentation.

The process herein separates the aroma and flavor volatiles from pasteurized fruit juice. The deflavored juice is fermented with yeast to remove sugar by converting it into alcohol, carbon dioxide, and water. After fermentation, the alcohol is removed from the apple juice, along with any additional flavors produced by fermentation. This then removes any off-flavors and aromas from the yeast reaction. The alcohol fraction can be combined with the previously separated aroma and flavor volatiles to make a "fruit" brandy. The juice without the sugars is concentrated and the aroma and flavor volatiles are added back. The low calorie juice can be artificially sweetened or mixed with other juices.

Therefore, it is an object of the present invention to provide a process for producing a lower calorie fruit beverage or beverage concentrate which contains at least 75%, and in some instances as much as 90% or more of the aroma and flavor volatiles present immediately after extraction of the juice.

It is a further object of this invention to produce a juice, and in particular, an apple juice, which is lower in sugar and calories by hydrolyzing the sugars using yeast and then removing the alcohol without degrading or totally removing the aroma and flavor volatiles.

It is still a further object of this invention to provide a means for pasteurizing a juice beverage before the separation of the aroma and flavor components and the sugar.

It is also an object of this invention to remove substantially all of the oxygen from a juice beverage in order to prevent flavor degradation due to caramelization of the sugar, browning reactions, oxidation of phenolic and lipid components, and other chemical oxidation reactions of the aroma and flavor volatiles.

These and other objects of this invention will become apparent by the description of the invention below.

SUMMARY OF THE INVENTION

The present invention relates to a process for preparing fruit or vegetable juice beverages by:

(a) pressing juice from a fruit or vegetable;

(b) heating the fruit or vegetable juice to a temperature of from about 45° C. to about 110° C. for from about 3 seconds to about 12 seconds;

(c) aerosolizing the juice at a temperature of from about 100° C. to about 55° C. and at a pressure of from about 5 mm Hg to about 200 mm Hg to separate a volatile fraction from a dearomatized bottoms fraction;

(d) recovering said volatile fraction at a temperature of from about 10° C. to about −190° C.;

(e) fermenting said bottoms fraction with yeast at a temperature of from about 20° C. to about 40° C. for at least 16 hours;

(f) removing the yeast; and (g) sterilizing and concentrating the bottoms fraction while removing the alcohol.

The microfine aerosol is created by spraying the heated juice through a nozzle having a diameter of from 100 to about 1200 microns at a velocity of from about 100 m/sec. to about 250 m/sec.

The dearomatized, fermented beverage can then be sterilized and/or concentrated by any of a number of methods known in the art. The recovered aroma and flavor volatiles can be blended with a dearomatized concentrate to produce a beverage or beverage concentrate. When reconstituted with water, the resulting beverage will contain at least 75% of the aroma and flavor volatiles which were originally present in the beverage before it was processed.

The volatiles recovered from one juice can also be blended with other beverages or juices to produce blended beverage flavors. For example, apple and pear concentrates could be mixed with the recovered aroma and flavor volatiles from either or both to provide an apple/pear flavored concentrate.

DETAILED DESCRIPTION OF THE INVENTION

Any beverage containing sugar and aroma and flavor compounds can be processed using this invention. Thus, the process is equally applicable to apple, cranberry, pear, peach, plum, apricot, nectarine, grape, cherry, currant, raspberry, gooseberry, blackberry, blueberry, strawberry, lemon, orange, grapefruit, potato, tomato, lettuce, celery, spinach, cabbage, watercress, dandelion, rhubarb, carrot, beet, cucumber, pineapple, custard-apple, cocona, pomegranate, guanabana, kiwi, mango, papaya, banana, watermelon and cantaloupe. Preferred juices are apple, pear, cranberry, orange, strawberry, grape and cherry.

Aroma and flavor volatiles are those compounds which partition from the beverage into the headspace above the beverage. Volatile compounds generally include a low boiling fraction, i.e., a highly volatile fraction, and a high boiling fraction, i.e., a less volatile fraction.

The highly volatile compounds are those which are eluted first from a capillary gas chromatographic column (described in detail later). For most fruit juices, and especially for apple juice, these compounds are characterized by having a boiling point less than about 131° C. These highly volatile compounds are generally low molecular weight aldehydes, ketones, alcohols, esters and acids. They also include low molecular weight sulfur compounds (e.g., thiols, sulfides), and low molecular weight nitrogen compounds (e.g., amines, pyrazines, pyridines, etc.). The volatiles include, but are not limited to, acetaldehyde, methanol, ethanol, butanol, hexanal, ethyl butyrate, ethyl acetate, propyl acetate, methyl propyl acetate, butyl acetate, methyl butyl acetate, hexyl acetate and acetic acid.

The lesser volatile fraction comprise those compounds which elute after the highly volatile compounds. In apple juice these compounds have a boiling point above about 131° C. These lesser volatile compounds include terpenes, higher molecular weight alcohols (e.g. linalool), esters, aldehydes (e.g. geranial, octanal, and decanal), ketones, ketoacids and oils.

The beverage concentrate composition herein can be made from an all-natural product. Although the following description of the process of this invention is described with particular reference to making an apple juice concentrate, it will be understood that the process is not limited thereto. Any beverage containing aroma and flavor volatiles and pectin may be used. Thus, the process is equally applicable to other fruit juices, e.g., pear, cranberry and grape juices, as well as vegetable juices.

Extraction of the Beverage

The juice is generally pressed or squeezed from washed fruit. The peel, rag, seeds and large pulp or cellulosic materials (pomace) are then removed in a finishing step, if necessary. Preferably, the squeezing is accomplished under conditions designed to minimize oxidation, i.e., in an inert atmosphere. The fruit, and in particular the apples, are thoroughly washed to remove all adhering dirt. Washing may be accomplished by dumping the fruit or apples into troughs of moving water, separating them from the water, and spray washing the fruit. They can also be treated with strong water sprays as they move along a roller-type conveyor. The apples are then sorted by hand or machine to remove all partially or wholly decayed fruit. These decayed apples sometimes contain patulin, a mold toxin.

The washed and sorted apples which may consist of the various varieties from North, Central and South America, South Africa, Europe, Eastern Europe, Australia, New Zealand, Japan and China, are then prepared for extraction by reducing them to a mash. Preferably, the apples are mashed in an oxygen-restricted atmosphere, having less than about 2% oxygen in the atmosphere surrounding the system. Two different pieces of equipment are generally used for this extraction procedure. The first type of mashing apparatus, a Rätz Mühle (manufactured by Lauffer Company, in Horb, Germany), grates the apples to a mash and is most commonly used in Europe. The other type which is most commonly found in North America, is a hammer mill, e.g. Fitzmill ®, made by Fitzpatrick Company, Elmhurst, Ill.) which smashes and cuts the apple such that it passes through openings of varying sizes as desired. This equipment is fully described in Possman et al., "Processing of Stored Fruit-Technical Concepts and their Costs", *Confructa Studien.* Vol. 29, November, 1985, pp 136–165.

The most common apparatus for expressing or separating the juice from non-soluble cell wall or tissue components in the expressed juice are (1) hydraulic cider press, (2) pneumatic juice press, (3) continuous screw type press, (4) continuous plate press, (5) semi-continuous plate press, (6) horizontal basket press, (8) a screening centrifuge, (7) rack and cloth press, and (9) continuous belt press.

If desired, the remaining tissue structures (pomace) can be slurried with water and treated with enzymes for the total liquefication of these remaining solid portions of the apple, such as starch, pectin and proteinaceous cytoplasmic cell membranes. This liquefied pomace can itself be further processed to extract additional juice by further expression by any of the above methods.

These methods for expressing juice by pressing and enzymatic treatment are more fully described in Nelson et al., *Fruit and Vegetable Juice Processing Technology,* AVI Publishing Co., pp 216–229 (1980).

The preferred method of mashing the apples and removing the juice is the use of a Rätaz Mühle to grind the apples and a continuous belt press to express the juice. Most preferred is the use of the Rätz Mühle and continuous belt press under an inert atmosphere. The inert atmosphere can be provided by blanketing the apparatus with nitrogen or another non-reactive, non-oxidative gas such as helium, argon or carbon dioxide. In this manner virtually all the oxygen is excluded from the process. This produces a better quality juice and pomace by avoiding or reducing any enzymatic or non-enzymatic oxidation and/or browning reactions in the mash.

The raw juice from fruits such as tomatoes, as it comes from the extractor or squeezing process contains pulp and seeds. These are separated from the juice in a "finisher". The finisher contains a screen which removes the pulp and seeds from the juice. The screen opening size can range from about 0.1 mm to about 2.5 mm. When the screen opening is larger than 2.5 mm, small seeds pass into the juice and contaminate it.

The expressed juice is then passed through a filter or hermetic centrifuge and deposited into a surge tank. The residence time in the surge tank, which is preferably blanketed in an inert atmosphere, must be kept to a minimum, preferably less than one hour, to avoid any possible enzymatic and non-enzymatic oxidation and/or browning reactions and other loss of flavor and/or aroma. In order to maintain the quality and freshness of the juice, the temperature in the surge tank is preferably not higher than about 25° C. Temperatures much above 25° C. can cause apple juice to brown more rapidly.

In order to preserve the aroma and flavor of the juice and to minimize the activity of enzymes present in the juice, the juice should be held for as short a time as is possible before it is sterilized. Preferably the time from pressing the juice through sterilization is less than 15 minutes. The exact time will depend upon the size of the equipment and the efficiency of the sterilization unit.

Removal of Volatiles and Sterilization

The fruit or vegetable juice is pumped at a pressure of from about 100 psi (pounds per square inch) to about 5000 psi, preferably from about 3500 psi to about 4500 psi, from the surge tank through a heat exchanger and heated to a temperature of from about 45° C. to about 110° C., preferably about 75° C. to about 95° C. for a time of from about 3 seconds to about 12 seconds, preferably about 3 seconds to about 9 seconds. The juice is fed into a vacuum chamber having a pressure of from about 5 mm Hg to about 200 mm Hg, preferably 30 mm Hg to about 100 mm Hg, and most preferably from 30 mm Hg to 70 mm Hg to create an aerosolized juice. A stream of the juice is fed into the chamber or sprayed into the chamber in a manner which creates submicron size droplets which are best described as a microfine aerosol. The temperature of the juice in the chamber is from about 10° C. to about 55° C.

Preferably this temperature will be at 45° C. to 55° C. It was discovered that at this temperature the pectin haze is considerably less in the final juice product. Pectin haze is a clouding of the juice.

In the preferred embodiment of this invention a stream of juice is accelerated through a nozzle or nozzle system consisting of a plurality of nozzles arranged in such a mode as to permit optimum vapor expansion substantially without liquid droplet collision. A triangular nozzle cluster arrangement (hexagonal densest packing) in the horizontal or vertical planes packing mode, is preferred in the vacuum chamber.

It should be noted that apple juice contains small particles consisting of small cell wall fragments. These fragments will pass through the nozzle without adversely affecting the dispersal of the liquid portion of juice. The nozzle through which the apple juice passes has an opening of about 100 microns to 1200 microns, preferably the opening is from 250 microns to about 400 microns. The velocity at which the Juice travels through the nozzle is 100 m/sec to 300 m/sec, preferably 200 m/sec to 250 m/sec. A multitude of nozzle types can be used. However, it has been found that nozzles with hardened openings are preferred, i.e., those made of hardened steel or semi-precious and precious stones (rubies, diamonds, sapphires, etc.) of a Mohs Scale hardness grade of 7 or higher. These hardened nozzle openings have been found to erode less rapidly than nozzle openings encased with ordinary steel or brass. Examples of nozzles and method of distributing liquids suitable for use in the present invention are found in Masters, K., *Spray Drying Handbook* (3rd Ed.), 1972, pp. 165–256.

If desired, from 80 psi to 150 psi of steam is introduced into the system to add activation energy for phase transformation in the system. Care must be taken not to add too great a quantity of steam; generally the condensed steam should comprise less than about 5% by weight of the juice. Steam can be metered into the column or directly into the juice by a needle-type valve which permits precise steam flow rates into the column. Other inert gases (non-oxidizing) such as nitrogen, helium or carbon dioxide can be used instead of the steam.

Atomization or aerosolization of the juice greatly increases the surface area/weight ratio of each discrete liquid droplet of the juice to such an extent that the aroma and flavor materials instantaneously vaporize without significant diffusional delay under the pressure and temperature conditions specified. Of course, some of the water also vaporizes, ranging from about 0.1% to about 15% of the total starting liquid. This intrinsic transformation of water into steam aids in the near quantitative removal of the aroma and flavor compounds from the submicron liquid droplets. These aroma and flavor components generally constitute less than about 0.05% to about 1.4% of the starting materials. Surprisingly, more than 75%, and in some instances as much as 90% or more, of the aroma components are transformed into vapors and are readily separable and therefor recoverable. This novel process provides a surprisingly high separation of aroma components in an instantaneous separation mode without destruction or loss of the volatiles or of the nonvolatiles and without costly multi-stage steam stripping as previously used in the art.

During the process of aroma/flavor vaporization in the vacuum chamber, instantaneous cooling of the heated beverage occurs. The temperature reduction depends on the entrance temperature of the juice into the vacuum chamber and the vacuum. Final temperatures in the vacuum chamber range from 10° C. to 55° C., preferably from 20° C. to 40° C.

At the same time this process serves to both sterilize and to deoxygenate the beverage. Removal of substantially all the oxygen in the system is essential to avoid oxidative reactions from taking place during the aroma and flavor volatile removal. At these elevated temperatures the interaction of oxygen with aroma and flavor compounds, and color bodies is facilitated. In the presence of oxygen and elevated temperatures, the natural color of apple juice turns an unappetizing milky muddy color. As discussed above, the steam which can be optionally introduced, or dissolved also provides energy to liberate the oxygen which has been absorbed into the beverage. The oxygen is removed from the juice via a vacuum pump and can be collected in, for example, a liquid nitrogen trap, or be vented to the atmosphere. Otherwise, the liberated oxygen could be reabsorbed onto both dissolved components and particulate components of the juice.

The bottoms are pumped from the vaporizer and are treated in a fermentation step. The bottoms can be cooled and stored prior to fermentation. If the juice is cooled, energy can be saved if the hot juice is used to partially heat the incoming juice in a heat exchanger. It, in turn, is partially cooled thereby.

Recovery of the Volatiles

The aroma and flavor volatiles are removed from the separation column or chamber. Preferably the volatiles are passed through a demister or entrainment system which serves to retain any droplets or particles which cannot be atomized. Any conventional demister can be used. Basically these systems have a torturous path. A preferred demister consists of a fine wire mesh expanding over the entire width of the condenser duct. The wire is about 6 cm wide.

The volatiles are recovered by passing through a condenser system, ring pump, compression system or other means known in the art for condensing gases. The recovery is at temperatures of from about 0° C. to about −190° C. The actual temperature of condensation will depend upon the flow rate of the vapors to be condensed and the heat exchange rate between the coolant and the volatiles within the condensation system. While the majority of the water vapor and some of the volatile compounds in the apple juice condense around 10° C., condenser temperatures of from about −110° C. to about −76° C. are sufficient to condense substantially all of the aroma and flavor volatiles from most fruit and vegetable juices at low pressure. The condensers are under the same pressure as the separation column or chamber.

Preferably, the more readily condensable fraction consisting of water and lower boiling hydrophilic components is collected at a temperature of about 10° C. The remaining volatiles are condensed at from about −110° C. to about −75° C. This insures collection of virtually all the recovered volatiles from the juice.

The noncondensed vapors which remain in the system are finally condensed in a tortuous trap or traps. These traps collect at a temperature of from about −110° C. to about −76° C. and contain, for example, liquid Freon®11 and carbon dioxide. Additional traps collect at a temperature of from about −195° C. to about −115° C. which will condense any remaining vapors from the system. Usually liquid air or liquid nitrogen is employed in this final trap.

The condensed materials are stored in closed tanks with an inert gas blanket, preferably nitrogen, and are preferably shielded from light to prevent light induced reactions of the aroma and flavor compounds. Relatively little water (from 0.1% to 14% of the weight of the starting juice) is contained in the condensates; thus it is not necessary to further separate the aroma and flavor materials from the condensate in rectification columns, as is necessary in the methods of prior art.

This process can also be utilized to remove gaseous antioxidants such as sulfur dioxide in juices where, for example, the starting fruit or vegetable has been blanched in sulfur dioxide (a preservative).

Fermentation

The dearomatized bottoms fraction is treated with yeast. Yeasts react with the carbohydrates in the fruit to produce ethanol (alcohol), carbon dioxide and water. Yeasts are commonly used in wine making to ferment fruit sugars. Any dry yeast, yeast cakes or yeast slurries can be used. Yeasts are available from Kitzinger and Bernkastel (FDR, Germany).

The dearomatized bottoms fraction is heated, if necessary, to a temperature in the range of about (20° C.)

°F. to about 125° F. (51° C.) while being treated with the yeast. The pH of the bottoms fraction should be between about 2.8 to about 5. The pH may be adjusted, as necessary, to a value of from about 2.8 to about 5, with a food grade acid or base. For apple juice, a pH of from about 2.9 to about 4.0 is common. In general, apple juice does not need an adjustment of its pH for the fermentation to occur efficiently.

From about 0.01 g/l to about 5.0 g/l, preferably from about 0.05 g/l to about 2.0 g/l of yeast is used.

The yeast is allowed to react until the sugar has been fermented, generally this is for at least about 16 hours, and, preferably from about 48 hours to about 10 days. In a continuous process 16 hours is sufficient; for batch process, 48 hours is usually sufficient. The time will depend upon batch size, yeast control and sugar content. During the yeast treatment, it is preferred that the juice be shielded from light and oxygen to prevent oxidation reactions. The carbon dioxide evolved during the fermentation provides an inert headspace over the product. The progress of the fermentation can be measured or monitored by the evolution of carbon dioxide. When the gas stops evolving, the sugar has been oxidized. It is not necessary to ferment all of the sugar. Lower calorie products can be made in which only a portion of the sugar is fermented.

After the yeast has hydrolyzed the sugars, the juice is centrifuged or filtered to remove the yeast. Any conventional centrifugation, filtration, or ultrafiltration process can be used to remove the yeast solids.

Evaporation of the Bottoms to Remove the Alcohol

The alcohol can be removed by distillation or evaporation. The preferred evaporation process is the same as that used to remove the volatiles and described in detail above.

Evaporation can be carried out in evaporators of the ascending or descending film type, in evaporators combining the ascending and descending film feature; in multiple tube evaporators, in plate type evaporators, expanding flow evaporators, centrifuged evaporators and reboilers. Such evaporators are described by U. Schobinger and D. Sulc in *Handbuch der Getranketechnologie*. Frucht-und Gemusesafte, Verlag Eugen Ulmer, Stuttgart, Germany (1978), pages 223 to 288. The vacuum chamber or column used to remove the aroma flavor volatiles can also be used to concentrate the bottoms fraction.

The dearomatized beverage bottoms are concentrated by conventional evaporation techniques. These bottoms contain low molecular and high molecular weight carbohydrates which were not fermented, vitamins, non-volatile phenolic substances, lipids, metal ions, etc.

Evaporation economically removes the alcohol and also some water. The juice "concentrate" can be stored safely at reduced temperatures. In addition, the evaporation step may collect any aroma and flavor materials which were not removed in the separation step or which were released during fermentation. Evaporation should be carried out in a manner that artificial, cooked or manufactured flavors are minimized or totally eliminated.

A multi-stage, multi-effect vacuum evaporator such as the TASTE (thermally accelerated short time evaporator) is used. The temperature profile used in this invention is preferably controlled so that the maximum juice temperature is about 40° C. to about 90° C. The evaporators can be operated using either forward flow or mixed flow. The vessel where the steam is flowing is called an effect. The vessel where the juice flows is the stage. Forward flow occurs when the juice is fed to the same vessel as the steam and then follows a path through different vessels in parallel to the vapor flow. Mixed flow occurs when the juice is introduced to one of the intermediate vessels where it is evaporated by vapor generated in the preceding vessel. After partial concentration the juice is then fed to the first vessel where it is evaporated using fresh steam. Evaporation takes place in one or more stages following the feed stage and also following the first effect.

In each case, forward or mixed flow, the steam and the vapor flow in the first effect and in subsequent effects is in the same pattern. The vapor starts at the highest pressure and ends at the stage with the lowest pressure. Any suitable vacuum system can be used to remove non-condensables, but typically this will be a multi-stage steam ejector system. The process is operated at pressures of about 2 inches (50 mm) to about 4 inches (100 mm) of mercury absolute.

In a multiple effect evaporator, steam is used only on the first effect and each subsequent effect is heated by vapor evaporated in the preceding stage. This vapor is primarily water but it also contains volatile materials originally in the juice. These volatiles can be recovered by removing part of the vapors from the heating side of the evaporation effect. This removal stream is passed through a series of fractionators, condensers, and coolers to obtain a cold liquid essence rich in volatile fractions. This procedure is commonly practiced in the industry.

Newer types of evaporators such as the narrow bore ascending liquid column evaporator, Sigma Star (available from Schmidt GmbH., Bretten, Germany), are preferably applied. Also, a wiped film evaporator with the condenser built directly into the center of the wiped film evaporator, as in the short path evaporator manufactured by Leybold-Heraeus, Hanau, Germany for oil separation/distillation, is preferably applied.

The evaporator volatiles collected in the process herein are different from the commercial essences since almost all of the volatile materials have previously been removed in the aerosolization step. These volatiles contain the alcohol and other volatiles generated in the fermentation practice.

These evaporator volatiles are generally not added back to the concentrated product in the blend tank because they have off flavors. These volatiles can be fractionated to separate the alcohol and other desirable flavors. If the water content of the evaporator volatiles is high, or if the evaporator volatiles are to be stored, then it is more economical to concentrate the evaporator volatiles, e.g. by conventional rectification processes. The alcohol can be separately collected and used with other wines or alcoholic beverages. This makes an alcoholic beverage or "brandy".

The evaporated concentrate is cooled and can either be pumped to a blend tank and mixed with other components of the product or further chilled to about −18° C. and stored in tanks and drums under the inert gas atmosphere such as nitrogen or carbon dioxide. These storage tanks should be shielded from light to prevent light-induced degradation of the concentrate.

The evaporated concentrate can be treated with from about 0.1% to about 10% of activated charcoal to clarify the juice and to remove any undesirable fermented yeast flavor. Ultrafiltration can also be used for this purpose.

Blending

The juice without sugar can be blended with fresh sterilized or pasteurized juice to make a lower calorie (lower sugar product). On the volume/volume basis, blends of from 10:1 to 1:10 are preferred.

The condensed aroma and flavor volatiles prepared from the fresh juice above can be blended in tanks with the alcohol stripped fermented juice to make a low calorie juice. If a citrus juice blend concentrate is to be made, pulp can also be added. It has been found that a concentration of pulp in the range of from 5% to 19% (v/v) is an acceptable concentration in a citrus juice concentrate. Preferably, the amount of pulp will be 6% to 12% (volume/volume) having a size of 0.50 mm. to 5 mm.

Packaging

The juice concentrate is then packaged to insure long-term stability. Preferably, the packaging materials should be impervious to oxygen and damaging light radiation. Optionally, the concentrate can be packed under an inert gas to minimize the oxygen content of any container headspace.

The product is kept at a temperature of 0° C. or less during long-term storage. Preferably, it is held at a temperature of from −10° C. to −74° C. for frozen juices.

Apple Juice Aroma and Flavor Condensates

The natural juice concentrate prepared by the process described above is unique in its retention of at least 75% of the volatile compounds originally present in the starting juice and its low sugar content.

Gas chromatographic analysis of the volatile portion of apple juice indicates that there are at least 500 compounds, and probably considerably more, present in the volatile portion of apple juice. Complete identification of all of these volatile compounds has not yet been achieved. The volatile compounds which are believed responsible for the fresh aroma and flavor character of apple juice are composed of carbonyl compounds, acids, esters, terpenes, and other volatile hydrocarbons.

The acetate esters (ethyl acetate, propyl acetate, methyl acetate, methyl propyl acetate, butyl acetate and hexyl acetate) comprise about 0.1% up to about 80% of the volatile compounds and are partially responsible for the fruity character of apple juice. Their presence alone, however, does not produce the entire apple aroma and flavor. The retention of high levels of the acetate esters, along with the retention of at least 75% of the total volatile compounds, is indicative of the retention of volatile compounds which are present even in very minute amounts, and provides apple juice products which have a flavor and aroma closely approximating that of the natural juice.

It has also been found that freshly pressed natural apple juice contains a relatively low amount of alcohols, particularly ethanol. This composition is maintained in the product made from the process described herein. However, this is not the case in commercial juices prepared by conventional processes. In those juices the alcohol content is strikingly increased, ranging from about 30% to about 96% of the aroma/flavor volatiles, while the esters, especially acetate esters, are decreased down to about 5% to about 20% of their original amount.

For those reasons, the acetate esters, methanol and ethanol are strong indicators of the differences between natural and processed juices. Fresh natural juices have been found to have an acetate ester/ethanol ratio of from about 2:1 to 200:1. The volatile fraction and the juices manufactured by the process of the present invention have an acetate ester: ethanol ratio of from about 2:1 to about 150:1, preferably about 5:1 to about 150:1 and most preferably 10:1 to about 150:1. Juices manufactured by processes known in the prior art have an acetate ester: ethanol ratio of from about 0.007:1 to about 1.5:1.

ANALYTICAL PROCEDURES

Gas chromatographic counts are the automatically integrated peak areas of the gas chromatographic recorder. They are directly related to the concentration of each of the compounds present in the volatile mixture.

The method for determining headspace concentrations of volatile compounds according to the present invention is as follows:

1. Equipment and Procedure

A 5 ml aliquot of the beverage is placed in a 65 ml head-space vial with a stir bar, and capped with Mininert ® sample valve. The headspace vial is equilibrated for 20 minutes at 20° C. prior to sampling 1 ml of the headspace using a 1 ml Hamilton gas tight syringe.

The volatile components of the headspace are analyzed using a Hewlett Packard 5880 GC equipped with an injector/trap (see Rodriguez et al., *J. Chromatoor.*, 236 (1982), pp. 36–49) and a 60 m. ×0.25 mm. I.D. thick film (1 micron) J&W DB-1 fused silica column. The temperature program used is 10° C. to 220° C. at 5° C./minute and holding at that temperature for 5 minutes before ending the run.

2. Instrument Calibration and Calculations

In order to calculate the mass of the components in the headspace, two instrument parameters are determined. These are (1) the mass transfer efficiency through the injector/trap and the GC; and (2) the flame ionization detector (FID) response factor.

These measurements are performed using radiolabeled $^{14}$C-decane. The specific activity of the decane is 116 disintegrations per minute per nanogram. The decane is placed in a 65 ml headspace vial with a magnetic stir bar, capped with a Mininert$^R$ valve and stirred for 1 minute at room temperature prior to sampling. Headspace samples are withdrawn using a 1 ml Hamilton gas-tight syringe.

The transfer efficiency is established by counting the ratio of the radioactive mass recovered from the instrument to the radioactive mass injected. A ratio of about 1.00, within experimental error (5%), indicates quantitative transfer of components through the instrument.

The FID response factor is established by calculating the ratio of the FID signal area corresponding to decane (in electronic integrator counts) to the mass of decane injected as determined by the decane specific activity. The response factor is referenced to the actual carbon content of the decane. In addition, the carbon based FID response factor for ethanol is established by the same method to provide quantification of oxygen containing compounds. The values determined (for the Hewlett Packard GC integrator System) are 3700 counts/nanogram carbon for decane and 2860 counts/-nanogram carbon for ethanol.

3. Headspace Concentration Calculations

The quantitative volume/volume concentrations for the identified individual headspace (gas phase) components are then calculated by using the various factors of transfer efficiency, FID response and corresponding mass fraction of carbon for the individual component (upon which the FID response is based), and of the molecular weight, according to the following formula:

$$C_{gas}=A_{IC}\times 1/R_F\times 1/MW\times 1/V_S\times T\times MV\times 10^9$$

where:

$C_{gas}$=the headspace concentration (v/v) for each compound
in ppb;

$A_{IC}$=area of the chromatographic peak in electronic integrator
counts (using flame ionization detection);

$R_F$=response factor (integrator count/ng carbon) based on response factor for ethanol for oxygen containing compounds or
decane for all other compounds;

$F_C$=the mass fraction of carbon in each compound;

MW=the molecular weight of the compound in nanograms;

$V_S$=volume of headspace sample (ml.);

T=transfer efficiency (value of 1.0 determined);

MV=molar volume (in ml.) of an ideal gas at 20° C. and 1 atmosphere.

To illustrate the calculation of the concentration of ethanol in a headspace sample showing 100 hypothetical area counts, the following calculation is carried out:

$$C\ v/v\ \text{gas} = 100 \times \frac{1}{2960} \times \frac{1}{\frac{24}{46}} \times \frac{1}{46 \times 10^9} \times \frac{1}{1} \times 1.0 \times 24060 \times 10^9 = 33.868\ \text{ppb ethanol}$$

The area counts and concentrations are presented to three significant figures corresponding to the accuracy of this method (approximately 10%).

EXAMPLE 1

Part A 453.6 kg of a mixture of German apple varieties having an average diameter of 2.5 to 4.5 inches are washed thoroughly. The apples are then inspected to remove those of unsound, i.e., rotten or delayed, composition. The apples are then ground to a mash in a Rätz Mühle Model No. SFR2 to a particle size ranging from about 1 mm to about 3 mm in average diameter. The apple mash is pressed and then is screened with a continuous belt press (Bodenstab; Flottweg Type B-FRU-1000) with a yield of about 77% by weight of the starting apples. This amounts to about 349.3 kg of apple juice having a concentration of 12.1° Brix.

Part B

The juice from Part A is centrifuged on a Westfalia hermetically sealed centrifuge, Type SB #7-47-076, #1880 959, and is pumped into a holding tank. From there the juice is continuously pumped via Milton Roy Piston Pumps at a pressure of about 4000 psi through a tube and shell heat exchanger (to deactivate the yeasts and microorganisms). The residence time in the heat exchanger is about 9 seconds. The juice reaches a temperature of approximately 75° C. The juice then exits through a nozzle, in a funnel position, made of stainless steel with a sapphire lining and an opening of 508 microns at a velocity of about 250 m/second into a cylindrical vessel under a vacuum of 40–50 mm, thereby, atomizing the juice into submicron droplets and forming a microaerosol. The juice droplets are instantaneously cooled to a temperature of 24° C. due to the consumption of heat occurring during the partial vaporization. The vapors are then condensed in condensing systems consisting of a series of two coil condensers (cooled with ethylene glycol) at a temperature of about −10° C. and a series of two condensing vessels (cooled with liquid Freon®11 and dry ice) at a temperature of about −110° C., and two tortuous traps (the first one cooled with liquid Freon®11 and dry ice, and the second one with liquid nitrogen) at a temperature of about −190° C. The remaining juice (90%) is collected as bottoms in another trap and cooled with ice water.

Part C

Production of Fermented Apple Juice

The bottoms fraction of apple juice resulting after removal of the volatile aroma components in Part B is heated to a temperature ranging from 25° C. to 32° C. To 41 kg of this Juice is added 68 fluid ounces of Kitzinger Reinhefe Liebfraumilch yeast and 6 gm of yeast slurried in distilled water is added to the bottoms fraction in a 10 gallon tank fitted with a valve to release the carbon dioxide. The tank contents are shielded from light and air. The starting Brix of the mixture is 14.6.

The bottoms fraction (containing the yeast) is held for seven days at 29°–32° C. The yeast treated bottoms fraction is then centrifuged on a Westfalia hermetically sealed centrifuge, Type SB #7-47-076, #1880 959, and is pumped into a holding tank. From there the juice is continuously pumped via Milton Roy Piston Pumps at a pressure of about 4000 psi through a tube and shell heat exchanger (to deactivate any remaining yeasts and microorganisms). The residence time in the heat exchanger is about 9 seconds. The juice reaches a temperature of approximately 75° C. The juice then exits through a nozzle, in a funnel position, made of stainless steel with a sapphire lining and an opening of 508 microns at a velocity of about 250 m/second into a cylindrical vessel under a vacuum of 40–50 mm, thereby, atomizing the juice into submicron droplets and forming a microaerosol. The juice droplets are instantaneously cooled to a temperature of 24° C. due to the consumption of heat occurring during the partial vaporization. The vapors are then condensed in condensing systems consisting of a series of two coil condensers (cooled with ethylene glycol) at a temperature of about −10° C. and a series of two condensing vessels (cooled with liquid Freon®11 and dry ice) at a temperature of about −110° C., and two tortuous traps (the first one cooled with liquid Freon®11 and dry ice, and the second one with liquid nitrogen) at a temperature of about −190° C. The remaining juice (90%) is collected as bottoms in another trap and cooled with ice water.

The fermented juice has a concentration of 4.5° Brix and the bottoms collected after the alcohol and other volatiles are removed is 3.8° Brix. This change in Brix is due to the removal of alcohol. Brix is measured by the index of refraction fraction. The alcohol causes the index of refraction to be different from a pure juice reading.

The reconstituted juice (i.e., bottoms fraction and stoichiometric amount of aroma fractions) is then subjected to UHT (ultrahigh temperature, short time sterilization treatment) in a Crepaco steam sterilizer, model UG 101. The sterilized juice is packed into clear glass bottles, Pure Paks (paper cartons) and Hypa Pacs (laminated paper cartons with aluminum bottoms and aluminum lids).

EXAMPLE 2

Two separate fermentation runs are made. Juice is extracted and centrifuged as in Example 1. However, the aroma and flavor volatiles are removed in a column temperature of 45° C. and 90° C. respectively. Both juices are the same and both are fermented with Liebfraumilch enzyme as in Example 1. The juice from the higher temperature volatile separation is cloudy after the fermentation and is treated by an ultrafiltration step to remove the cloudiness (suspended pectins). The lower temperature juice is clear.

Juice from the low temperature separation is blended with 10% of the aroma removed during Part A to make a juice that is low in calories.

EXAMPLE 3

Juice from Example 1 is blended with ⅓ volume of freshly squeezed apple juice to produce a lower sugar apple juice.

Juice from Example 2 is blended with fresh pressed juice on a 50:50 volume per volume basis. This blend is carbonated at 20 psi to make a sparkling natural apple juice with 50% less sugar.

EXAMPLE 4

Fermented juice from Part B of Example 1 is decanted from the yeast and ultrafiltered through a XM 50, nominal 50,000 molecular weight ultrafilter. This feed is heated to 90° C. and passed through a 20 mil sapphire lined nozzle. The nozzle is 25.4 cm from the top of the column. The vacuum in the column is 20 torr (20 mm). The feed pump pressure is about 4000 psi. After the first pass additional water is added. After the second pass the product is stored at 0° C. for future use. The alcohol content is 5.4% in the first feed, 2.50% in the first bottoms, 0.84% in the second pass bottoms. These bottoms are passed over a charcoal bed (about 5% charcoal) to remove any yeast flavors which may remain.

This juice (3.1 kg) is mixed with 6.4 kg of freshly pressed apple juice, and 500g of the aroma fraction from Part A. A reduced calorie juice product is prepared which tastes like fresh apple juice.

What is claimed is:
1. A process for preparing a low calorie beverage which comprises:
 (a) pressing juice from a fruit or vegetable;
 (b) heating the fruit or vegetable juice to a temperature of from about 45° C. to about 110° C. for a time of from about 3 seconds to about 12 seconds,
 (c) aerosolizing said juice at a temperature of from about 10° C. to about 55° C. at a pressure of from about 5 mm Hg to about 200 mm Hg such that a volatile fraction is separated from a bottoms fraction;
(d) recovering said volatile fraction at a temperature of from about 10° C. to about −190° C.
(e) fermenting said bottoms fraction with yeast at a temperature of from about 20° C. to about 40° C., for at least about 16 hours;
(f) removing the yeast; and
(g) concentrating and sterilizing the bottoms fraction while removing the alcohol to make a beverage concentrate.

2. A process according to claim 1 which comprises the additional step (h) of adding back volatiles from (c) to the bottoms fraction of (g).

3. A process according to claim 2 wherein the fermentings the pH of the bottoms
fraction in step (e) is from about 2.8 to about 5.

4. A process according to claim 3 wherein the yeast is a wine making yeast and wherein step (e) for at least 2 days.

5. A process according to claim 3 wherein the juice is apple juice.

6. A process according to claim 3 wherein the juice is heated in step (a) to a temperature of from about 75° C. to about 95° C. for a time of from about 3 seconds to about 9 seconds.

7. A process according to claim 6 wherein the juice is aerosolized at a temperature of from about 20° C. to about 40° C. at a pressure of from about 30 mm to 100 mm by spraying said juice through a nozzle opening of about 100 microns to about 1200 microns at a velocity of 100 m/sec. to about 250 m/sec.

8. A process according to claim 7 wherein said juice is dispersed through a nozzle with an opening of from about 250 microns to about 600 microns.

9. A process according to claim 8 wherein said juice is dispersed through said nozzle at a velocity of from about 200 m/sec. to about 250 m/sec.

10. A process according to claim 9 wherein said volatiles in step (a) are recovered by condensation.

11. A process according to claim 10 carried out in a substantially oxygen-free environment.

12. A process according to claim 11 wherein said beverage is a fruit juice.

13. A process according to claim 12 wherein said beverage is apple juice.

14. A process according to claim 12 wherein said beverage is selected from the group consisting of pear, grape, cherry, orange and cranberry juice.

15. A process according to claim 3 wherein the fermented bottoms fraction is concentrated and wherein from about 30% to 100% of said volatile fraction from step (a) is blended into said concentrated fermented bottoms fraction thereby producing a low calorie beverage concentrate.

16. A process according to claim 11 wherein the bottoms fraction from step (h) is blended with from 1:10 to 10:1 (V/V) parts of fresh juice and concentrated and wherein from about 30% to about 100% of said volatile fraction is blended into the concentrated beverage.

17. A process according to claim 16 wherein said juice is apple juice.

18. The beverage concentrate product of the process of claim 13.

19. The beverage concentrate product of the process of claim 14.

20. A processed low calorie apple juice concentrate according to claim 17 which is prepared from fresh apple juice wherein the processed apple juice concentrate contains at least about 75% of the volatile compounds originally found in the fresh apple juice.

* * * * *

UNITED STATES PATENT AND TRADEMARK OFFICE
CERTIFICATE OF CORRECTION

PATENT NO. : 4,971,813

DATED : 11/20/90

INVENTOR(S) : R. G. K. Strobel & R. E. Tarr

It is certified that error appears in the above-identified patent and that said Letters Patent is hereby corrected as shown below:

Column 16, lines 11-12:

In Claim 3, line 1 delete -- the fermentings --

Signed and Sealed this

Nineteenth Day of May, 1992

Attest:

DOUGLAS B. COMER

Attesting Officer     Acting Commissioner of Patents and Trademarks